US012611819B1

(12) United States Patent
Liu et al.

(10) Patent No.: US 12,611,819 B1
(45) Date of Patent: Apr. 28, 2026

(54) FILTER ASSEMBLY AND MODELING APPARATUS

(71) Applicant: AtomForm Technology (Shenzhen) Co., Ltd., Shenzhen (CN)

(72) Inventors: Bin Liu, Shenzhen (CN); Jigeng Shang, Shenzhen (CN)

(73) Assignee: AtomForm Technology (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 19/289,009

(22) Filed: Aug. 2, 2025

(30) Foreign Application Priority Data

Mar. 7, 2025 (CN) .......................... 202510277062.5
Jun. 27, 2025 (CN) .......................... 202521351152.6

(51) Int. Cl.
*B29C 64/364* (2017.01)
*B29C 64/209* (2017.01)
(Continued)

(52) U.S. Cl.
CPC .......... *B29C 64/364* (2017.08); *B29C 64/209* (2017.08); *B29C 64/241* (2017.08);
(Continued)

(58) Field of Classification Search
CPC ... B29C 64/209; B29C 64/364; B29C 64/245; B29C 64/268; B33Y 30/00; B22F 12/38; B22F 12/70
See application file for complete search history.

(56) References Cited

U.S. PATENT DOCUMENTS

2015/0108687 A1* 4/2015 Snyder .................. B29C 64/393
                                                425/375
2016/0214175 A1* 7/2016 Nordstrom .............. B22F 12/70
                        (Continued)

FOREIGN PATENT DOCUMENTS

CN       217274680 U    8/2022
CN       218429992 U    2/2023
                (Continued)

OTHER PUBLICATIONS

DE 202025104140.5, search report dated Dec. 18, 2025.

*Primary Examiner* — Galen H Hauth
*Assistant Examiner* — Baileigh Kate Darnell
(74) *Attorney, Agent, or Firm* — IPro, PLLC

(57) ABSTRACT
The application provides a filter assembly and a modeling apparatus. The filter assembly comprises an internal circulation filter assembly applicable to the modeling apparatus, which comprises a casing enclosing an accommodation cavity. The internal circulation filter assembly comprises a first air inlet, a first air outlet and a first air-guiding channel connecting the first air inlet and the first air outlet, wherein both the first air inlet and the first air outlet communicate with the accommodation cavity. The internal circulation filter assembly further comprises a first fan and a first filter assembly, wherein the first fan is configured to draw the exhaust gases inside the accommodation cavity through the first air inlet, and the exhaust gases are filtered by the first filter assembly and then discharged from the first air outlet through the first air-guiding channel. Through the present application, the exhaust gases generated can be efficiently filtered.

20 Claims, 8 Drawing Sheets

(51) Int. Cl.
| | |
|---|---|
| *B29C 64/241* | (2017.01) |
| *B29C 64/245* | (2017.01) |
| *B29C 64/268* | (2017.01) |
| *B33Y 30/00* | (2015.01) |

(52) U.S. Cl.
CPC .......... *B29C 64/245* (2017.08); *B29C 64/268* (2017.08); *B33Y 30/00* (2014.12)

(56) References Cited

U.S. PATENT DOCUMENTS

| | | |
|---|---|---|
| 2018/0043627 A1 | 2/2018 | Barclay et al. |
| 2020/0262143 A1 | 8/2020 | Gibson |
| 2023/0166448 A1 | 6/2023 | Pino et al. |

FOREIGN PATENT DOCUMENTS

| | | |
|---|---|---|
| CN | 115847812 A | 3/2023 |
| CN | 221724484 U | 9/2024 |
| CN | 221775321 U | 9/2024 |
| CN | 119368768 B | 3/2025 |

\* cited by examiner

FILTER ASSEMBLY AND MODELING APPARATUS

CROSS-REFERENCE TO RELATED APPLICATIONS

The present application claims priority to Chinese Patent Application No. 202510277062.5, entitled "Print Head Assembly, Filter Assembly, Cutting Module, Writing Module, and Modeling apparatus", filed with the China National Intellectual Property Administration on Mar. 7, 2025, and Chinese Patent Application No. 202521351152.6, entitled "Filter Assembly and Modeling apparatus", filed with the China National Intellectual Property Administration on Jun. 27, 2025. The entire contents of both applications are hereby incorporated by reference in their entirety.

TECHNICAL FIELD

The present application relates to 3D printing technology, and particularly to a filter assembly and a modeling apparatus.

BACKGROUND 3D printing apparatus is a kind of rapid prototyping process device. The most commonly used 3D printing technology at present is Fused Deposition Modeling (FDM), which is a technology that is based on a digital model, heats materials such as plastic to a molten state, extrudes them through a nozzle, and then constructs three-dimensional objects through layer by layer printing.

In order to expand the application scope of the aforementioned modeling apparatus, a variety of expansion modules, such as laser modules, cutting modules, or writing modules, can be installed on the print head assembly or drive unit.

When the expansion module is a laser module, materials such as plastic or wood may generate toxic, pungent exhaust gases accompanied by a large amount of smoke and dust during laser engraving or cutting operations. Such exhaust gases may pose a threat to the health of users. Further, such exhaust gases may contain combustible components, and there may be a risk of combustion when they accumulate in large quantities.

SUMMARY

The embodiments of the present application provide a filter assembly and a modeling apparatus capable of efficiently filtering exhaust gases generated by the modeling apparatus through a circulating filtration method.

The technical solutions of the embodiments in the present application are realized as follows.

In a first aspect, a filter assembly is provided for a modeling apparatus, wherein the modeling apparatus comprises a casing enclosing an accommodation cavity; the filter assembly comprises an internal circulation filter assembly, wherein the internal circulation filter assembly comprises a first air inlet, a first air outlet and a first air-guiding channel connecting the first air inlet and the first air outlet, and both the first air inlet and the first air outlet communicate with the accommodation cavity; the internal circulation filter assembly further comprises a first fan and a first filter assembly, wherein the first fan is configured to draw exhaust gases inside the accommodation cavity through the first air inlet, and the exhaust gases are filtered by the first filter assembly and then discharged from the first air outlet through the first air-guiding channel;

and/or, the filter assembly comprises an external circulation filter assembly, wherein the external circulation filter assembly comprises a second fan and a second filter assembly, a second air-guiding channel is formed on a sidewall of the casing for communicating the interior and exterior of the accommodation cavity, and the second fan and the second filter assembly are provided in the second air-guiding channel; the second fan is configured to discharge the exhaust gases inside the accommodation cavity to the outside of the accommodation cavity through the second air-guiding channel.

According to the aforementioned technical solution, the internal circulation filter assembly may achieve repeated filtration of the exhaust gases within the accommodation cavity through internal circulation, thereby efficiently purifying the exhaust gases and enhancing the purification efficiency. During 3D printing operations, the environmental pollution caused by toxic gases can be reduced; during laser cutting or laser engraving operations, the accumulation of combustible gases within the accommodation cavity can be prevented, thus mitigating fire risks. The external circulation filter assembly is utilized to filter and discharge the exhaust gases in the accommodation cavity, thus preventing the accumulation of harmful gases within the accommodation cavity. Furthermore, as the air in the cavity is drawn out under the action of the external circulation filter assembly, a negative pressure environment can be created inside the accommodation cavity, preventing harmful gases from escaping through gaps in the casing.

In some embodiments, the first fan is an axial flow fan.

According to the aforementioned technical solution, the axial flow fan, characterized by their simple structure, high flow rate, and low pressure, can enhance purification efficiency of the accommodation cavity when applied to the modeling apparatus.

In some embodiments, the first fan is provided between the first air inlet and the first air outlet.

According to the aforementioned technical solution, exhaust gases within the accommodation cavity can be drawn in through the first air inlet, filtered by the first filter assembly, and then discharged from the first air outlet through the first air-guiding channel.

In some embodiments, the first fan is provided between the first air inlet and the first air-guiding channel, or the first fan is provided between the first air-guiding channel and the first air outlet.

According to the aforementioned technical solution, exhaust gases within the accommodation cavity can be drawn in through the first air inlet, filtered by the first filter assembly, and then discharged from the first air outlet through the first air-guiding channel.

In some embodiments, the first filter assembly comprises one or a combination of more than one of a primary-efficiency filter screen, a medium-efficiency filter screen, a high-efficiency filter screen, and an activated carbon filter screen.

According to the aforementioned technical solution, the filter assembly is configured as a multi-stage filter screen or a combination thereof, enabling graded filtration of particulate matter and harmful gases under different application scenarios.

In some embodiments, the first filter assembly is provided on an outer side of the first air inlet, where airflow is filtered by the first filter assembly before entering the first air-guiding channel through the first air inlet and being discharged through the first air outlet. Alternatively, the first filter assembly is provided upstream of the first fan and the first air-guiding channel, or the first filter assembly is provided between the first air-guiding channel and the first air outlet. According to the aforementioned technical solution, the internal circulation filter assembly can achieve repeated filtration of exhaust gases within the accommodation cavity through internal circulation, thereby efficiently purifying the exhaust gases and enhancing the purification efficiency.

In some embodiments, the external circulation filter assembly is operable to draw air inside the accommodation cavity, filters the air, and then discharges it to the outside of the accommodation cavity. The casing is provided with an air intake, and the external circulation filter assembly creates a negative pressure environment within the casing by exhausting the air outward.

According to the aforementioned technical solution, leakage of the exhaust gases can be prevented; meanwhile, part of the exhaust gases can be purified through the second filter assembly.

In some embodiments, the second filter assembly comprises one or a combination of more than one of a primary-efficiency filter screen, a medium-efficiency filter screen, a high-efficiency filter screen, and an activated carbon filter screen.

According to the aforementioned technical solution, the filter assembly is configured as a multi-stage filter screen or a combination thereof, enabling graded filtration of particulate matter and harmful gases under different application scenarios.

In a second aspect, a modeling apparatus is provided, comprising a casing that encloses an accommodation cavity, wherein the modeling apparatus further comprises the filter assembly according to any one of the first aspect.

According to the aforementioned technical solution, by providing an internal circulation filter assembly in the modeling apparatus, the internal circulation filter assembly is utilized to draw exhaust gases inside the accommodation cavity, filter them, and then discharge them back into the accommodation cavity, thereby achieving repeated filtration of the exhaust gases. The exhaust gases circulate within the accommodation cavity, preventing the harmful gases from escaping and causing environmental pollution and personal injury risks. Furthermore, by providing an external circulation filter assembly in the modeling apparatus, the external circulation filter assembly is utilized to filter and discharge exhaust gases in the accommodation cavity, preventing accumulation of harmful gases within the accommodation cavity. Additionally, as the air in the cavity is drawn out under the action of the external circulation component, a negative pressure environment is generated inside the accommodation cavity, further preventing the harmful gases from escaping through gaps in the casing.

In some embodiments, the internal circulation filter assembly is provided in a quantity of one, with the one internal circulation filter assembly being provided on a sidewall of the casing; or the internal circulation filter assembly is provided in a quantity of two, with the two internal circulation filter assemblies are symmetrically provided on opposite sidewalls of the casing.

According to the aforementioned technical solution, in the modeling apparatus, an appropriate number of the internal circulation filter assembly can be selected based on the size of the casing and various purification requirements, thereby enhancing space utilization of the equipment and optimizing airflow circulation pathway.

In some embodiments, the modeling apparatus integrates at least one of the functions of 3D printing, laser engraving, cutting, and writing.

During operation, such modeling apparatus may generate pollutants such as particulate matter and/or harmful gases. According to the aforementioned technical solution, the exhaust gases within the accommodation cavity can be filtered to prevent the harmful gases from escaping.

In some embodiments, the modeling apparatus is configured to utilize the internal circulation filter assembly to repeatedly filter the exhaust gases within the accommodation cavity, when the modeling apparatus is performing 3D printing.

According to the aforementioned technical solution, during 3D printing operations, the environment pollution caused by toxic gases can be reduced.

In some embodiments, the modeling apparatus further comprises a print head assembly, a drive unit, and a work platform. The print head assembly is connected to the drive unit and is driven by the drive unit to generate displacement relative to the work platform. The print head assembly comprises a mounting portion and an expansion module. The mounting portion comprises at least one first guide member extending along a first direction, and the expansion module comprises at least one second guide member extending along the first direction. The first guide member and the second guide member are mutually engageable. The print head assembly further comprises a locking mechanism configured to provide a force for the mounting portion and the expansion module to move closer to or away from each other when the first guide member and the second guide member are mutually engaged, so as to restrict movement of the expansion module in a second direction perpendicular to the first direction.

According to the aforementioned technical solution, by providing the mutually engageable guide members and a locking mechanism between the mounting portion and the expansion module of the print head assembly, after the expansion module is moved to the mounting position along the guide members, the locking mechanism enables the guide members on the mounting portion and the expansion module to closely fit together. This eliminates the sliding clearance between the guide members, making the installation process convenient and the connection reliable.

In some embodiments, the expansion module is a laser module, and the drive unit is configured to drive the laser module to move on a horizontal plane to cut and/or engrave a material.

According to the aforementioned technical solution, by means of the drive unit provided on the print head assembly, the movement of the laser module can be precisely controlled to cut and/or engrave materials from various horizontal positions, thereby obtaining various intricate patterns.

In some embodiments, a rotating device is provided on the work platform, and the rotating device is configured to drive a rotating body or an object with an irregular surface to rotate.

According to the aforementioned technical solution, efficient cutting or engraving operations on the irregularly shaped objects is enabled, thus significantly expanding the processing range of the 3D printing apparatus.

In some embodiments, the laser module is configured to emit a laser beam to irradiate the material, causing the material to melt, vaporize, or reach its ignition point, and the molten or burning material can be blown away by an airflow coaxial with the laser beam.

According to the aforementioned technical solution, the molten or burning material can be removed with a high-speed airflow coaxial with the laser beam.

In some embodiments, the modeling apparatus is configured to utilize the external circulation filter assembly to filter the exhaust gases in the accommodation cavity and then discharge them to the outside of the accommodation cavity, when the modeling apparatus is performing laser engraving or cutting operations.

According to the aforementioned technical solution, during laser cutting or laser engraving operations, the accumulation of combustible gases within the accommodation cavity can be prevented, thereby mitigating fire risks.

In some embodiments, the locking mechanism comprises at least one eccentric wheel handle assembly, the eccentric wheel handle assembly comprising an eccentric wheel rotatably connected to the expansion module and a handle fixedly connected to the eccentric wheel. According to the aforementioned technical solution, by employing an eccentric wheel handle assembly as the locking mechanism, the eccentric nature thereof may generate a pushing force during rotation, enabling reliable locking between the first and second guide members. The handle in the eccentric wheel handle assembly extends the lever arm, thus enhancing the convenience of user operation.

In some embodiments, the mounting portion further comprises a positioning unit, the positioning unit comprising a first stopper and/or at least one snap-fit structure. The first stopper comprises a blocking plate provided at an end of the mounting portion along the first direction. The snap-fit structure comprises a first snap formed on the mounting portion and a second snap formed on the expansion module. When the expansion module slides along the first direction to the end of the mounting portion under constraint of the first guide member and the second guide member, the first snap and the second snap are mutually engaged.

According to the aforementioned technical solution, the provision of the positioning unit may achieve precise installation and positioning of the expansion module, preventing excessive sliding. The snap-fit structure provides mechanical restraint, enhancing the connection strength between modules and reducing vibration.

In some embodiments, when the expansion module slides along the first direction to a position where the first snap and the second snap are mutually engaged under the constraint of the first guide member and the second guide member, the locking mechanism is configured to lock the expansion module and the mounting portion together.

According to the aforementioned technical solution, the first snap can engage with the second snap while the user is holding the expansion module during installation, thereby positioning the expansion module. Meanwhile, it will provide a noticeable change in force, allowing the user to perceive that the module has been installed properly in place.

Figure 1:
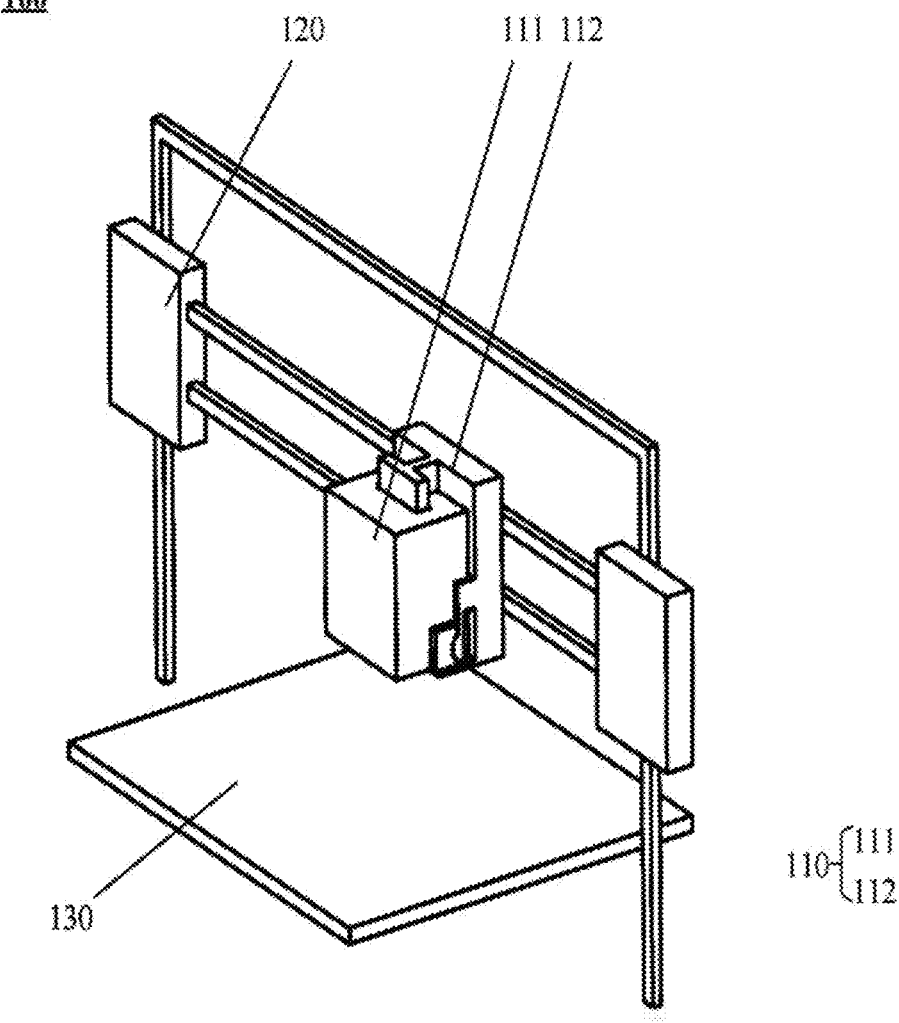
FIG. 1 illustrates a schematic structural diagram of a modeling apparatus provided in an embodiment of the present application.

The reference numerals and their corresponding names in the figures are as follows: Modeling apparatus 100, Print Head Assembly 110, Expansion Module 111, Second Guide Member 1111, Third Side Surface 11111, Fourth Side Surface 11112, Second Engagement Surface 1112, Shaft 1113, Mounting Portion 112, First Guide Member 1121, First Side Surface 11211, Second Side Surface 11212, First Engagement Surface 1122, Positioning Unit 1123, First Stopper 1124, Blocking plate 11241, Snap-Fit Structure 1125, First Snap 11251, Second Snap 11252, Flange 11253, Groove 11254, Eccentric Wheel Handle Assembly 113, Eccentric Wheel 1131, Handle 1132, Bearing 1133, Drive Unit 120, Work Platform 130, Casing 140, Internal Circulation filter Assembly 150, First Air Inlet 151, First Air Outlet 152, Guide Member 1521, First Air-guiding Channel 153, First Fan 154, First filter Assembly 155, External Circulation filter Assembly 160, Second Fan 161, Second filter Assembly 162.

DETAILED DESCRIPTION

In order to further clarify the objectives, technical solutions, and advantages of the present application, detailed descriptions will be provided below in conjunction with the accompanying drawings. The described embodiments should not be construed as limiting the scope of the present application. All other embodiments obtained by persons of ordinary skill in the art without inventive efforts shall fall within the scope of protection of the present application.

In the descriptions that follow, references to "some embodiments" denote subsets of all possible embodiments. It should be understood that "some embodiments" may refer to identical or different subsets of all possible embodiments and may be combined in a mutually non-conflicting manner.

In the descriptions that follow, the terminology "first/second/third" is used solely to distinguish similar objects and does not imply a specific sequence or priority for the objects. It should be understood that, where permissible, the terms "first/second/third" may be interchanged to allow the embodiments of the present application to be implemented in sequences other than those illustrated or described herein.

Unless otherwise defined, all technical and scientific terms used herein have the same meaning as commonly understood by persons skilled in the art to which the present application pertains. The terminology used herein is for the purpose of describing the embodiments of the present application and is not intended to limit the scope of the present application.

Prior to providing a further detailed explanation of the embodiments of the present application, a detailed description of the issues associated with 3D printing apparatus will first be presented.

3D printing apparatus, also known as three-dimensional printers or stereolithography apparatus, represents a type of rapid prototyping equipment that plays a pivotal role in modern manufacturing, design, and numerous other industries.

Currently, the most prevalent 3D printing technology is Fused Deposition Modeling (FDM). FDM is a technology that utilizes digital models to heat materials such as plastic into a molten state, extrude them through a nozzle, and construct three-dimensional objects through layer-by-layer deposition.

The print head assembly constitutes one of the critical components of 3D printing apparatus. It incorporates an extruder that generates relative displacement with the print platform under the drive of a drive unit. The extruder typically comprises a heating component and a nozzle. The heating component melts the printing material, while the nozzle extrudes the molten material to print models on the print platform.

For 3D printing apparatus equipped with a single extruder, the nozzle diameter and temperature parameters are generally fixed during a single print job, limiting it to single-material printing. Switching materials necessitates extruder replacement, a cumbersome process. Furthermore, after replacing the extruder, users must recalibrate the position of the new extruder; otherwise, printing accuracy will be significantly compromised, thereby increasing operational complexity.

In order to address these challenges, multiple extruders can be incorporated into the print head assembly, or the extruder can be designed for automatic replacement.

Consider an example where multiple extruders comprise a first extruder and a second extruder. The print head assembly further comprises a main frame connecting the extruders to the drive unit of the 3D printer. In such a print head assembly with two extruders, both extruders are connected to the main frame. The first extruder is fixedly connected to the main frame (referred to as the fixed extruder), while the second extruder is movably connected to the main frame, enabling displacement in the Z-axis direction (referred to as the movable extruder). During operation of the first extruder, the second extruder can be positioned above the first extruder to prevent collisions with printed objects on the print platform. When extruder switching is required, the second extruder is lowered such that its nozzle height is below that of the first extruder, enabling printing with the second extruder.

The first extruder and the second extruder may differ in various aspects. For instance, they may have different nozzle diameters. As an example, the first extruder may have a nozzle diameter of 0.2 mm, while the second extruder may have a nozzle diameter of 0.4 mm. By employing extruders of varying sizes, the 3D printing apparatus can accommodate printing tasks with different precision requirements. A smaller-diameter extruder, such as the first extruder, is suitable for high-precision, detailed prints, while a larger-diameter extruder, such as the second extruder, is advantageous for rapid prototyping or printing larger objects where moderate precision is acceptable. Alternatively, the extruders may be dedicated to different colors or materials. For example, the first extruder may be configured for ABS material, renowned for its strength and heat resistance, while the second extruder may be configured for PLA material, which is eco-friendly and easy to process. Such versatility enables the 3D printing apparatus to cater to a broader spectrum of applications.

As another potential embodiment, a storage area for extruders can be incorporated into the 3D printing apparatus, housing multiple extruders.

When extruder replacement is required, the drive unit moves the print head assembly to the extruder storage area. Auxiliary equipment, such as a manipulator, can then be employed to remove the extruder from the print head assembly, or the print head assembly can be designed for automatic extruder detachment. Subsequently, the new extruder is secured onto the print head assembly. Following extruder replacement, the drive unit moves the print head assembly from the storage area to the work area, and extruder calibration is performed.

In order to enhance the functionality of 3D printing apparatus and enable its application across a broader range of fields, expansion modules such as laser modules, cutting modules, and writing modules can be installed on the print head assembly. These expansion modules are capable of moving under the drive of the 3D printing apparatus's drive unit, thereby realizing functions including laser engraving, cutting, writing, and drawing.

Taking the laser module as an example, it can emit a high-power-density laser beam to irradiate materials, causing them to rapidly melt, vaporize, or reach their ignition point. Simultaneously, a high-speed airflow coaxial with the laser beam is employed to blow away the molten or combusted material. When integrated into 3D printing apparatus, the laser module can execute intricate movements based on the drive capability of the drive unit, thereby accomplishing various tasks. For instance, by precisely positioning the laser module to move horizontally over common materials such as paper or wood placed on the print platform, intricate patterns can be accurately cut. Furthermore, by controlling the laser focus while moving the laser module, internal engraving on transparent materials like glass or acrylic can be achieved. Additionally, by incorporating a rotating device on the print platform to drive the rotation of objects with rotational symmetry or irregular surfaces, and coordinating with the movement of the laser module, efficient cutting or engraving of irregularly shaped objects can be realized, significantly expanding the processing capabilities of the 3D printing apparatus.

The cutting module can be utilized for cutting materials such as paper, film, or stickers. During cutting operations, the material to be cut can be either securely adhered to the print platform of the printing apparatus or placed on a dedicated cutting platform. The cutting module is capable of moving along a target path under the drive of the drive unit, thereby forming preset patterns on the material being cut.

In a scenario where the expansion module is a writing module, the functionality of the 3D printer can be extended to that of an automatic writing machine (or writing robot). The writing module is equipped with a holder for writing instruments, allowing users to secure various types of writing tools, such as hard pens (e.g., pencils or ballpoint pens) or soft pens (e.g., brushes or felt-tip pens), onto the writing module. Under the drive of the drive unit, the writing module can perform writing or drawing functions on paper or canvas.

In related art, there are various methods for installing expansion modules.

The expansion module can be connected to the print head assembly using threaded fasteners such as bolts. More specifically, multiple threaded holes can be provided on the main frame of the print head assembly, and corresponding through-holes can be provided on the expansion module. By passing bolts through these through-holes and threaded holes, the expansion module can be firmly fixed to the main frame. This bolted connection method provides a secure and rigid attachment without wobbling. However, in order to ensure robustness, typically three or more bolts are required, which can complicate the installation process.

The expansion module also can be connected using magnetic attraction. Magnets can be mounted on the expansion module and/or the main frame, utilizing magnetic force to secure the expansion module to the main frame. This method offers simplicity and ease of operation. However, magnetic connections are generally less secure, posing a risk of detachment during rapid movement of the print head assembly or when subjected to external forces.

In view of the aforementioned issues, the embodiments of the present application provide a print head assembly and a modeling apparatus. The technical solutions of the present application will be described in detail below with reference to the accompanying drawings.

Figure 2:
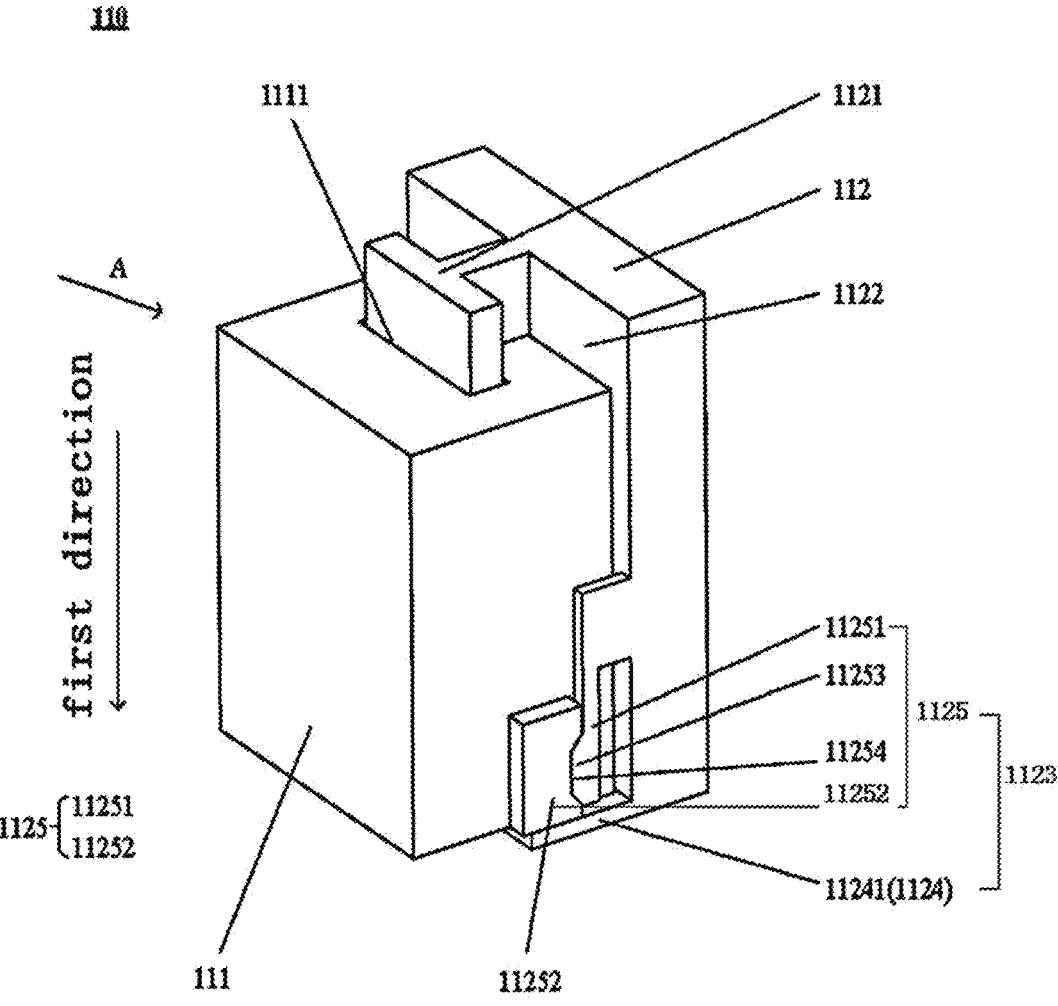
FIG. 2 illustrates a partial structural diagram of a print head assembly in FIG. 1.
Figure 3:
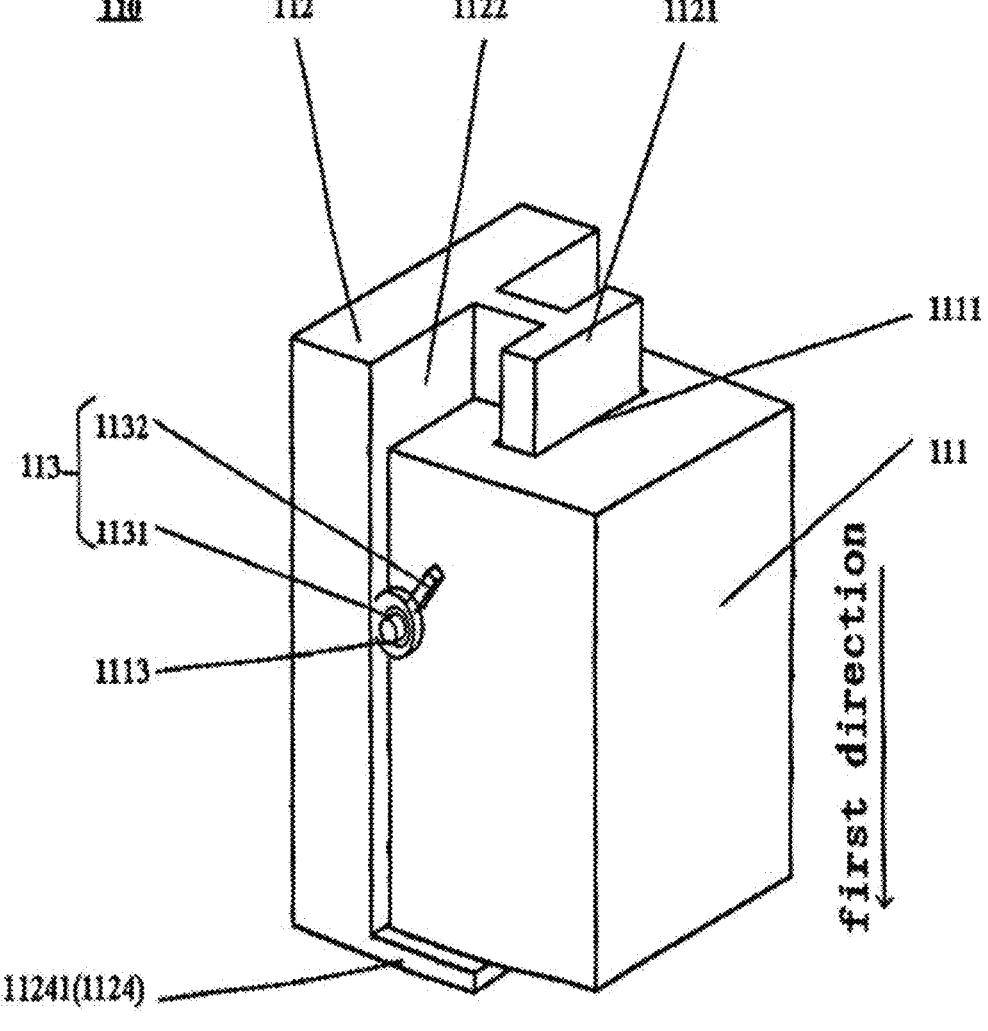
FIG. 3 illustrates a view in the direction A of FIG. 2.
Figure 4:
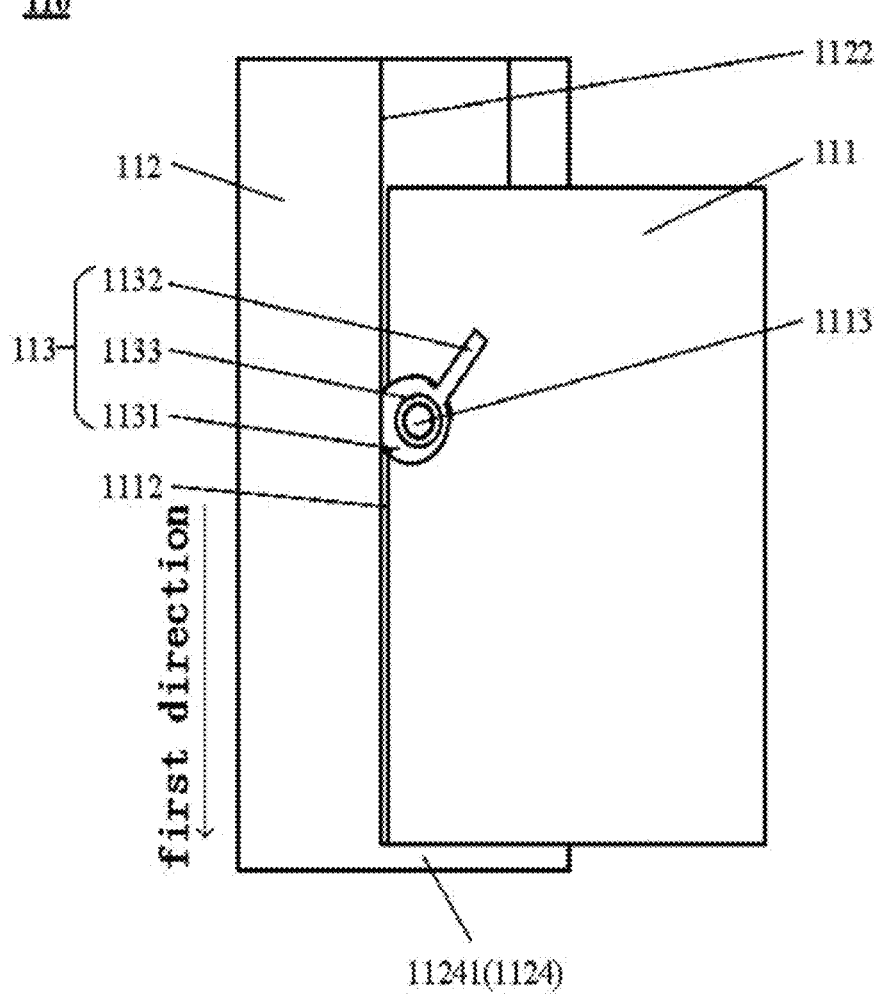
FIG. 4 illustrates a side view of FIG. 2.

The embodiments of the present application first provide a print head assembly applicable to a modeling apparatus. FIG. 1 illustrates a schematic structural diagram of the modeling apparatus provided in an embodiment of the present application, FIG. 2 illustrates an enlarged view of the print head assembly, and FIGS. 3 and 4 illustrate a view in the direction A and a side view of FIG. 2, respectively.

The modeling apparatus 100 depicted in FIG. 1 comprises a print head assembly 110, a drive unit 120, and a work platform 130.

The print head assembly 110 is connected to the drive unit 120 and configured to generate relative displacement with the work platform 130 under the drive of the drive unit 120, thereby enabling 3D printing, engraving, or cutting operations on the work platform 130.

The drive unit 120 can adopt various structural configurations. Exemplarily, the drive unit 120 may comprise motors and lead screws. Multiple lead screws can be arranged along the X-axis, Y-axis, and Z-axis directions, respectively. The motors are configured to drive the rotation of the lead screws, thereby causing the lead screw nuts to move along the axial directions of the lead screws and driving the print head assembly 110 to move along the X-axis, Y-axis, and Z-axis directions. Alternatively, the drive unit 120 may comprise motors and timing belts. The motors drive pulleys to rotate, which in turn drive the timing belts to move. By employing timing belt transmission mechanisms along different directions, multi-directional movement of the print head assembly can be achieved.

Referring concurrently to FIGS. 1-3, the print head assembly 110 comprises an expansion module 111 and a mounting portion 112.

In the embodiments of the present application, the expansion module 111 may also be referred to as a functional module, an add-on module, or an extension module.

The expansion module 111 may be, for example, a laser module, a cutting module, or a writing module as previously described. Alternatively, the expansion module 111 may be a milling module, an engraving module, or the like. The embodiments of the present application impose no specific limitations in this regard.

The mounting portion 112 may be the main frame of the print head assembly 110. The main frame is configured to mount an extruder, meaning that the expansion module 111 and the extruder are simultaneously mounted on the main frame. Alternatively, in some embodiments, where the extruder is directly connected to the drive unit 120 of the 3D printer, the mounting portion 112 may be provided on the extruder.

The mounting portion 112 comprises a first guide member 1121, and the expansion module 111 is provided with a second guide member 1111. Both the first guide member 1121 and the second guide member 1111 extend along a first direction, which corresponds to the installation direction of the expansion module 111.

In the example illustrated in FIG. 1, the first direction coincides with the Z-axis direction of the modeling apparatus 100, meaning that the expansion module 111 can be installed along the Z-axis direction of the modeling apparatus 100. As a possible embodiment, the first direction may also coincide with the X-axis or Y-axis direction.

In other words, the expansion module 111 can also be installed along the longitudinal or lateral direction of the modeling apparatus 100.

Continuing to refer to FIG. 1, the first guide member 1121 protrudes outward from a first engagement surface 1122 of the mounting portion 112. The first guide member 1121 may also be referred to as a guide rail. Correspondingly, the second guide member 1111 is a guide groove recessed inward from a second engagement surface 1112 of the expansion module 111. The first engagement surface 1122 and the second engagement surface 1112 are the mutually abutting surfaces of the mounting portion 112 and the expansion module 111, respectively.

In FIG. 1, the first guide member 1121 and the second guide member 1111 exhibit a T-shaped cross-section. Specifically, the first guide member 1121 is a protruding T-shaped rail structure, and the second guide member 1111 is a T-shaped guide groove 11254. This configuration enables the mutual engagement of the first guide member 1121 and the second guide member 1111, providing constraint to the expansion module 111 in directions other than the first direction.

It should be understood that the T-shaped cross-section of the first guide member 1121 and the second guide member 1111 depicted herein is merely illustrative. The cross-sections of the first guide member 1121 and the second guide member 1111 may alternatively be trapezoidal, Y-shaped, or other shapes. The embodiments of the present application impose no limitations in this regard.

Furthermore, the embodiments of the present application impose no specific limitations on the number of the first guide members 1121 and the second guide members 1111. The example illustrated in FIG. 1, which depicts one first guide member 1121 and one second guide member 1111, is merely illustrative. The number of first guide members 1121 and second guide members 1111 may be plural. For instance, two first guide members 1121 and second guide members 1111 may be arranged at spaced intervals along the X-axis or Y-axis direction, which can effectively reduce vibration of the expansion module 111.

It should be further noted that the embodiments of the present application impose no specific limitations on the formation directions of the first guide member 1121 and the second guide member 1111.

The example illustrated in FIG. 1, which depicts the first guide member 1121 as a protrusion and the second guide member 1111 as a recess, is merely illustrative. As an alternative embodiment, the first guide member 1121 may be a groove 11254 formed on the mounting portion 112, and the second guide member 1111 may be a protruding rail structure formed on the expansion module 111.

The print head assembly 110 further comprises a locking mechanism configured to provide, when the first guide member 1121 and the second guide member 1111 are mutually engaged, a force urging the mounting portion 112 and the expansion module 111 toward or away from each other, so as to bring the first guide member 1121 and the second guide member 1111 into close contact.

The aforementioned locking mechanism may be disposed on the expansion module 111 or on the mounting portion 112.

Exemplarily, the locking mechanism is disposed on the mounting portion 112. After the expansion module 111 is installed in place along the first direction, the locking mechanism is actuated to lock the expansion module 111 to the mounting portion 112, thereby constraining the expansion module 111.

The locking mechanism 113 is capable of providing a force urging the expansion module 111 and the mounting portion 112 toward or away from each other, causing the mutually facing surfaces of the first guide member 1121 and the second guide member 1111 to closely abut and eliminating any gap therebetween, thereby preventing vibration of the expansion module 111.

The locking mechanism 113 may be an automatic locking mechanism or a manual locking mechanism.

For an automatic locking mechanism, it may be implemented based on mechanical components. For example, an elastic member may be disposed on a surface of the mounting portion 112 adjacent to the expansion module 111. After the expansion module 111 is installed in place, the elastic member presses against the expansion module 111, providing a force urging the expansion module 111 away from the mounting portion 112 and causing the first guide member 1121 and the second guide member 1111 to closely abut. Alternatively, the automatic locking mechanism may be implemented based on automatic control. For example, an electric push rod or an electric pull rod may be disposed in the mounting portion 112. After the mounting portion 112 is installed in place, the electric push rod or electric pull rod drives the expansion module 111 to move away from or toward the mounting portion 112, thereby eliminating the gap between the first guide member 1121 and the second guide member 1111.

A manual locking mechanism may be, for example, a latch. After the expansion module 111 is installed in place, the user can engage the latch to eliminate the gap between the first guide member 1121 and the second guide member 1111.

According to the aforementioned technical solution, by providing mutually engageable guide members and a locking mechanism between the mounting portion 112 and the expansion module 111 of the print head assembly 110, after the expansion module 111 is moved to the mounting position along the guide members, the locking mechanism is actuated to bring the guide members on the mounting portion 112 and the expansion module 111 into close contact, thereby eliminating sliding clearances. This facilitates a convenient and secure installation process.

Figure 5:
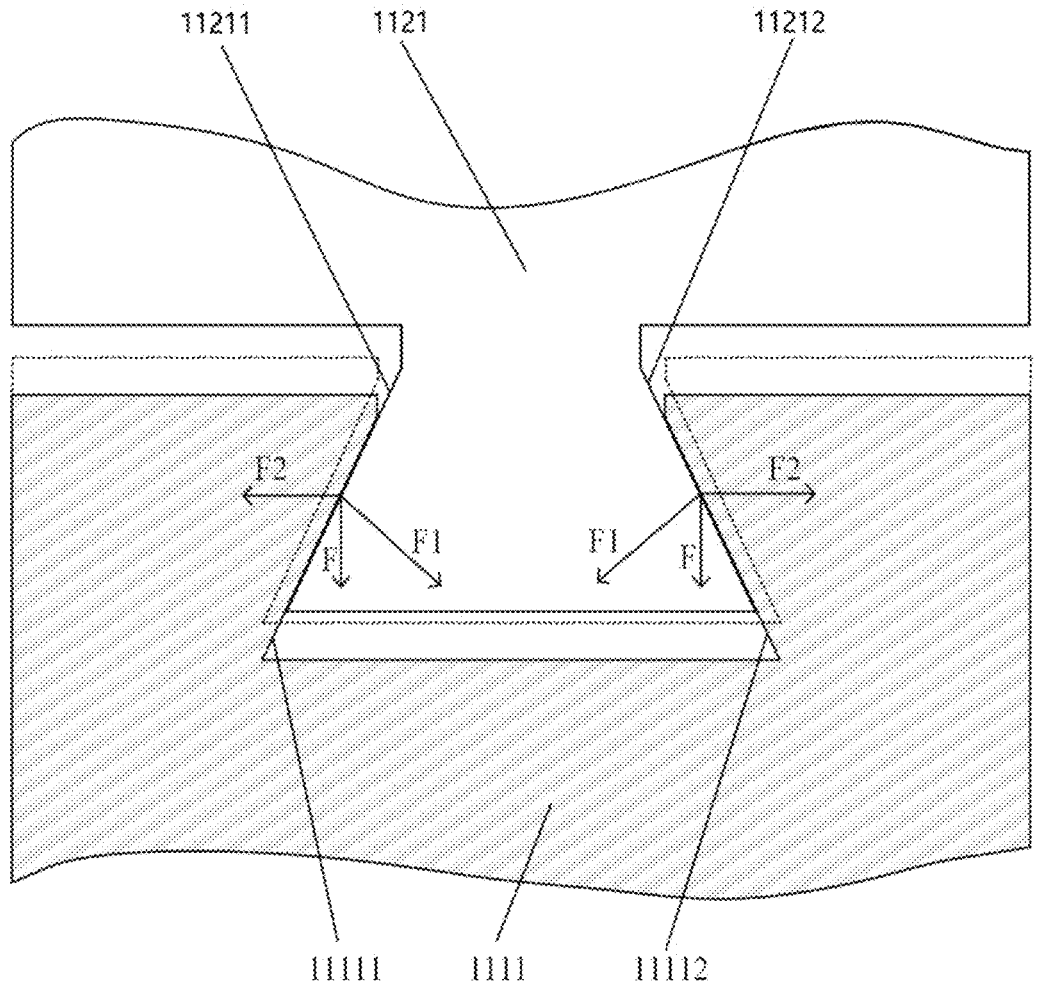
FIG. 5 illustrates a schematic cross-sectional diagram of a first guide member and a second guide member provided in an embodiment of the present application.

FIG. 5 illustrates a possible embodiment of the first guide member 1121 and the second guide member 1111. As shown in FIG. 5, the cross-sections of the first guide member 1121 and the second guide member 1111 are trapezoidal. The first guide member 1121 has a first side surface 11211 and a second side surface 11212 that are opposite to each other, and the second guide member 1111 has a third side surface 11111 and a fourth side surface 11112 that are opposite to each other. After the first guide member 1121 and the second guide member 1111 are mutually engaged, the first side surface 11211 is in close proximity to the third side surface 11111, and the second side surface 11212 is in close proximity to the fourth side surface 11112. The two surfaces that are in close proximity to each other are parallel to each other. Meanwhile, to ensure relative slidability between the first guide member 1121 and the second guide member 1111, the aforementioned two surfaces that are in close proximity to each other are not in intimate contact.

The dashed lines in FIG. 5 illustrate the state when the first guide member 1121 and the second guide member 1111 are in intimate contact. When the locking mechanism applies a force urging the first guide member 1121 and the second guide member 1111 to move away from each other, the thrust F provided by the locking mechanism is decomposed by the inclined surfaces into a first force component F1 perpendicular to the inclined surfaces and a second force component F2 in the horizontal outward direction, since the aforementioned surfaces are all inclined surfaces. The first force component F1, which is perpendicular to the inclined surfaces, causes the adjacent two surfaces to intimately contact, and the second force component F2 in the horizontal direction ensures that the first guide member 1121 and the second guide member 1111 are constrained in the horizontal direction.

In some embodiments, the locking mechanism may be an eccentric wheel handle assembly 113 as depicted in FIGS. 3 and 4.

In some embodiments, the eccentric wheel handle assembly 113 may be disposed on the expansion module 111.

The eccentric wheel handle assembly 113 comprises an eccentric wheel 1131 and a handle 1132 fixedly connected to the eccentric wheel 1131. The handle 1132 is secured to the exterior of the eccentric wheel 1131 along a diameter thereof. The eccentric wheel 1131 is rotatably connected to the expansion module 111, with its rotation center being offset from the geometric center of the outer periphery of the eccentric wheel 1131. The distance between the rotation center and the geometric center constitutes the eccentricity of the eccentric wheel 1131. The eccentric wheel handle assembly 113 is also referred to as a locking cam.

Upon rotation of the handle 1132, the outer periphery of the eccentric wheel 1131 approaches and eventually abuts against the surface of the mounting portion 112 adjacent to the expansion module 111 (i.e., the aforementioned first engagement surface 1122), providing a thrust force urging the expansion module 111 away from the mounting portion 112. This enables the first guide member 1121 and the second guide member 1111 to intimately contact. Simultaneously, the friction between the outer periphery of the eccentric wheel 1131 and the mounting portion 112 further locks the expansion module 111, thereby enhancing the installation robustness.

It should be understood that to prevent binding during insertion of the expansion module 111 along the first direction, a clearance necessarily exists between the first guide member 1121 and the second guide member 1111. The aforementioned eccentric wheel handle assembly 113 eliminates this sliding clearance by applying a thrust force, enabling the first guide member 1121 and the second guide member 1111 to intimately contact and thereby improving installation precision.

According to the aforementioned technical solution, by employing an eccentric wheel handle assembly 113 as the locking mechanism and utilizing its eccentricity to generate a thrust force during rotation, reliable locking between the mounting portion 112 and the expansion module 111 is achieved. The handle 1132 of the eccentric wheel handle assembly 113 extends the lever arm, thereby enhancing the ease of operation for the user.

In some embodiments, the outer periphery of the eccentric wheel 1131 may be coated with an elastically deformable material. For example, the outer periphery of the eccentric wheel 1131 may be rubberized or may have an elastic material such as rubber adhered to its outer surface. Such materials are capable of elastic deformation within a certain range. After the handle 1132 rotates the eccentric wheel 1131 such that the outer periphery of the eccentric wheel 1131 contacts the second engagement surface 1112, the deformation of the elastic material permits continued rotation of the eccentric wheel 1131, thereby further increasing the thrust force provided by the eccentric wheel 1131. Simultaneously, such elastic materials provide greater friction, preventing reverse rotation of the eccentric wheel 1131 and ensuring more robust locking.

In some embodiments, the eccentric wheel handle assembly 113 further comprises a bearing 1133 disposed between the eccentric wheel 1131 and the expansion module 111.

More specifically, the expansion module 111 is provided with a shaft 1113 protruding from its sidewall. The inner and outer rings of the bearing 1133 are connected to the outer circumference of the shaft 1113 and a bearing bore of the eccentric wheel 1131, respectively.

The embodiments of the present application impose no specific limitations on the type of the aforementioned bearing 1133. The bearing 1133 may be a rolling bearing 1133 or a plain bearing 1133. The rolling bearing 1133 may be a ball bearing 1133 or a roller bearing 1133.

According to the aforementioned technical solution, the bearing 1133 incorporated in the eccentric wheel handle assembly 113 reduces the frictional resistance during rotation of the eccentric wheel 1131, ensuring smooth locking operation. Additionally, it minimizes mechanical wear and extends the service life of the locking mechanism.

In the solution provided by the embodiments of the present application, the number of eccentric wheel handle assemblies 113 may be one, which is disposed on one side of the expansion module 111 in the width direction. Alternatively, the number of eccentric wheel handle assemblies 113 may be two, which are symmetrically disposed on both sides of the expansion module 111 in the width direction. The provision of two eccentric wheel handle assemblies 113 further enhances the installation robustness.

In some embodiments, the eccentric wheel handle assembly 113 further comprises an axial retaining member disposed at an end of the shaft 1113 remote from the expansion module 111 along the axial direction of the shaft 1113. The axial retaining member is fixedly connected to the shaft 1113 and configured to provide axial retention for the bearing 1133 and the eccentric wheel 1131.

Exemplarily, the axial retaining member may be a blocking plate secured to the end of the shaft 1113 using threaded fasteners such as screws. Alternatively, the axial retaining member may be a circlip fitted over the shaft 1113 and abutting against the bearing 1133.

According to the aforementioned technical solution, the provision of an axial retaining member in the eccentric wheel handle assembly 113 prevents axial movement of the bearing 1133 and the eccentric wheel 1131, thereby ensuring the structural stability of the locking mechanism.

In the embodiments of the present application, the mounting portion 112 further comprises a positioning unit 1123 configured to position the expansion module 111 along the first direction. The positioning unit 1123 comprises a first stopper 1124 and/or at least one snap-fit structure 1125.

As illustrated in FIG. 1, the first stopper 1124 may be a blocking plate 11241 disposed at an end of the mounting portion 112 along the first direction. When the expansion module 111 slides along the first direction to an end of the mounting portion 112 under the constraint of the first guide member 1121 and the second guide member 1111, an end of the expansion module 111 along the first direction can abut against the blocking plate 11241.

The aforementioned first stopper 1124 may be integrally formed with the body of the mounting portion 112. Alternatively, the first stopper 1124 may be a separate component from the body of the mounting portion 112 and may be assembled with the body of the mounting portion 112 via threaded fasteners such as bolts.

The snap-fit structure 1125 comprises a first snap 11251 formed on the mounting portion 112 and a second snap 11252 formed on the expansion module 111.

When the expansion module 111 slides along the first direction to an end of the mounting portion 112 under the constraint of the first guide member 1121 and the second guide member 1111, the first snap 11251 and the second snap 11252 mutually engage.

According to the aforementioned technical solution, by providing the positioning unit 1123, precise installation positioning of the expansion module 111 is achieved, preventing excessive sliding of the module. The snap-fit structure 1125 provides mechanical restraint, enhancing the connection strength between modules and reducing vibration.

In some embodiments, the first snap 11251 extends from an edge of the first engagement surface 1122 of the mounting portion 112 in a direction away from the first engagement surface 1122, and the second snap 11252 is formed on a sidewall of the expansion module 111, which sidewall is perpendicular to the second engagement surface 1112 of the expansion module 111.

Alternatively, as a possible embodiment, the first snap 11251 may be formed on the first engagement surface 1122, and the second snap 11252 may be formed on the second engagement surface 1112.

Exemplarily, as shown in FIG. 1, the first snap 11251 is a male snap, and the second snap 11252 is a female snap. The male snap has a flange 11253 extending outward from a distal end thereof in a direction away from the first engagement surface 1122, and the female snap has a groove 11254 that complements the flange 11253. When the expansion module 111 slides along the first direction to an end of the mounting portion 112 under the constraint of the first guide member 1121 and the second guide member 1111, the flange 11253 extends into the groove 11254, causing the first snap 11251 and the second snap 11252 to mutually engage, thereby positioning the expansion module 111.

According to the aforementioned technical solution, the structural design of the male and female snaps enhances the engagement reliability of the snap-fit structure 1125. The engagement of the flange 11253 and the groove 11254 prevents displacement of the module in a direction perpendicular to the engagement surfaces. Additionally, the snap-fit structure 1125 engages during manual installation of the expansion module 111, thereby positioning the expansion module 111. Meanwhile, it will provide a noticeable change in force, allowing the user to perceive that the module has been installed properly in place.

Taking the snap-fit structure 1125 illustrated in FIG. 1 as an example, one end of the first snap 11251 along the first direction is fixedly connected to the mounting portion 112, and the other end is free, forming a cantilever structure. The flange 11253 on the first snap 11251 is capable of elastic deformation within a certain range.

Both the flange 11253 of the first snap 11251 and the groove 11254 of the second snap 11252 are trapezoidal in shape. When the expansion module 111 slides such that the first snap 11251 and the second snap 11252 come into contact, an edge of the second snap 11252 first contacts an inclined edge of the trapezoidal flange 11253. Upon application of a force along the first direction, the inclined edge generates a component force directed towards the first engagement surface 1122, causing elastic deformation of the first snap 11251 and enabling continued movement of the expansion module 111 along the first direction. When the expansion module 111 reaches a target position at an end of the mounting portion 112, the first snap 11251 returns to its original shape, and the flange 11253 of the first snap 11251 extends into the groove 11254 of the second snap 11252, resulting in mutual engagement of the first snap 11251 and the second snap 11252.

It should be noted that the structure of the first snap 11251 and the second snap 11252 illustrated in FIG. 1 is merely illustrative. As a possible embodiment, the first snap 11251 and the second snap 11252 may be a female snap and a male snap, respectively.

It should be understood that the aforementioned at least one snap-fit structure 1125 may be one as illustrated in FIG. 1. Alternatively, the number of snap-fit structures 1125 may be two or more, and the two or more snap-fit structures 1125 may be distributed on different sides of the expansion module 111. For example, snap-fit structures 1125 may be provided on both sides of the expansion module 111 in the width direction.

It should further be understood that the positioning unit 1123 may comprise only the first stopper 1124, or only the snap-fit structure 1125, or both the first stopper 1124 and the snap-fit structure 1125. The embodiments of the present application impose no specific limitations in this regard.

Based on the print head assembly 110 disclosed in the aforementioned embodiments, the present application further provides a modeling apparatus 100. The modeling apparatus 100 may be a multi-functional modeling apparatus 100 capable of 3D printing, laser engraving, cutting, and writing. The structure of the modeling apparatus 100 is illustrated in FIG. 1.

The modeling apparatus 100 provided in this embodiment comprises a print head assembly 110, a drive unit 120, and a work platform 130. The print head assembly 110 is connected to the drive unit 120 and configured to generate relative displacement with the work platform 130 under the drive of the drive unit 120. The print head assembly 110 comprises a mounting portion 112 and an expansion module 111. The mounting portion 112 comprises at least one first guide member 1121 extending along the first direction, and the expansion module 111 comprises at least one second guide member 1111 extending along the first direction. The first guide member 1121 and the second guide member 1111 are configured to be mutually engageable.

The print head assembly 110 further comprises a locking mechanism configured to provide, when the first guide member 1121 and the second guide member 1111 are mutually engaged, a force urging the mounting portion 112 and the expansion module 111 toward or away from each other, so as to bring the first guide member 1121 and the second guide member 1111 into close contact.

The modeling apparatus 100 provided in the embodiments of the present application adopts a modular design for its print head assembly 110, enabling rapid replacement of functional modules and adapting to diverse processing requirements. During replacement of the expansion module 111, the mutual engagement of the guide members and the locking action of the locking mechanism ensure convenient module replacement and robust module connection.

In some embodiments, the locking mechanism comprises at least one eccentric wheel handle assembly 113. The structure of the eccentric wheel handle assembly 113 is illustrated in FIGS. 3 and 4. The eccentric wheel handle assembly 113 comprises an eccentric wheel 1131 rotatably connected to the expansion module 111 and a handle 1132 fixedly connected to the eccentric wheel 1131. The eccentric wheel handle assembly 113 is configured to: when the first guide member 1121 and the second guide member 1111 are mutually engaged, rotate the eccentric wheel 1131 such that an outer periphery of the eccentric wheel 1131 abuts against a surface of the mounting portion 112 adjacent to the expansion module 111, thereby providing a thrust force urging the expansion module 111 away from the mounting portion 112 and causing the first guide member 1121 and the second guide member 1111 to intimately contact.

In this technical solution, the thrust force generated by the eccentric wheel handle assembly 113 enables the guide members to intimately contact, minimizing clearance between modules. The rotational operation of the handle 1132 allows for rapid locking and release, thereby enhancing the replacement efficiency of functional modules in the modeling apparatus 100.

In some embodiments, the eccentric wheel handle assembly 113 further comprises a bearing 1133. The expansion module 111 is provided with a shaft 1113 protruding therefrom. An inner ring of the bearing 1133 is fitted over the shaft 1113, and a bearing bore of the eccentric wheel 1131 is fitted over an outer ring of the bearing 1133.

According to the aforementioned technical solution, the provision of the bearing 1133 between the eccentric wheel 1131 and the shaft 1113 reduces the rotational resistance of the eccentric wheel 1131, ensuring smooth locking operation. Additionally, it minimizes mechanical wear and extends the service life of the locking mechanism.

In some embodiments, the eccentric wheel handle assembly 113 further comprises an axial retaining member disposed at an end of the shaft 1113 remote from the expansion module 111 along an axial direction of the shaft 1113. The axial retaining member is fixedly connected to the shaft 1113 and configured to provide axial retention for the bearing 1133 and the eccentric wheel 1131.

According to the aforementioned technical solution, the axial retaining member in the eccentric wheel handle assembly 113 prevents axial movement of the bearing 1133 and the eccentric wheel 1131, thereby ensuring the structural stability of the locking mechanism.

In some embodiments, the mounting portion 112 further comprises a positioning unit 1123. The positioning unit 1123 comprises a first stopper 1124 and/or at least one snap-fit structure 1125. The first stopper 1124 comprises a blocking plate disposed at an end of the mounting portion 112 along the first direction. The snap-fit structure 1125 comprises a first snap 11251 formed on the mounting portion 112 and a second snap 11252 formed on the expansion module 111. When the expansion module 111 slides along the first direction to an end of the mounting portion 112 under the constraint of the first guide member 1121 and the second guide member 1111, the first snap 11251 and the second snap 11252 mutually engage.

According to the aforementioned technical solution, the positioning unit 1123 enables precise installation positioning of the expansion module 111, preventing excessive sliding of the module. The snap-fit structure 1125 provides mechanical restraint, enhancing the connection strength between modules and reducing vibration.

In some embodiments, the first snap 11251 extends from an edge of a first engagement surface 1122 of the mounting portion 112 (which is adjacent to the expansion module 111)

in a direction away from the first engagement surface 1122. The second snap 11252 is formed on a sidewall of the expansion module 111, which sidewall is perpendicular to a second engagement surface 1112 of the expansion module 111. The second engagement surface 1112 is the surface of the expansion module 111 that abuts against the first engagement surface 1122. The first snap 11251 is a male snap having a flange 11253 extending outward from a distal end thereof in a direction away from the first engagement surface 1122. The second snap 11252 is a female snap having a groove 11254 that complements the flange 11253. When the expansion module 111 moves to an end of the mounting portion 112, the flange 11253 extends into the groove 11254.

In addition to the aforementioned technical challenges, during engraving or cutting operations using the aforementioned laser module, materials such as plastic or wood may generate toxic, pungent exhaust gases accompanied by a large amount of smoke and dust, under laser irradiation. Such exhaust gases may pose a threat to the health of users. Further, such exhaust gases may contain combustible components, and there is a risk of combustion when they accumulate in large quantities.

The inventors of the present application thought of installing a filter screen or filter cartridge to adsorb these exhaust gases. However, the generation rate of exhaust gases in the aforementioned process is relatively fast, often resulting in incomplete adsorption, and a portion of the exhaust gases may slowly leak through gaps in the equipment.

In view of the aforementioned issues, the embodiments of the present application provide a filter assembly and a modeling apparatus. The technical solutions of the present application will be described in detail below with reference to the accompanying drawings.

Figure 6:
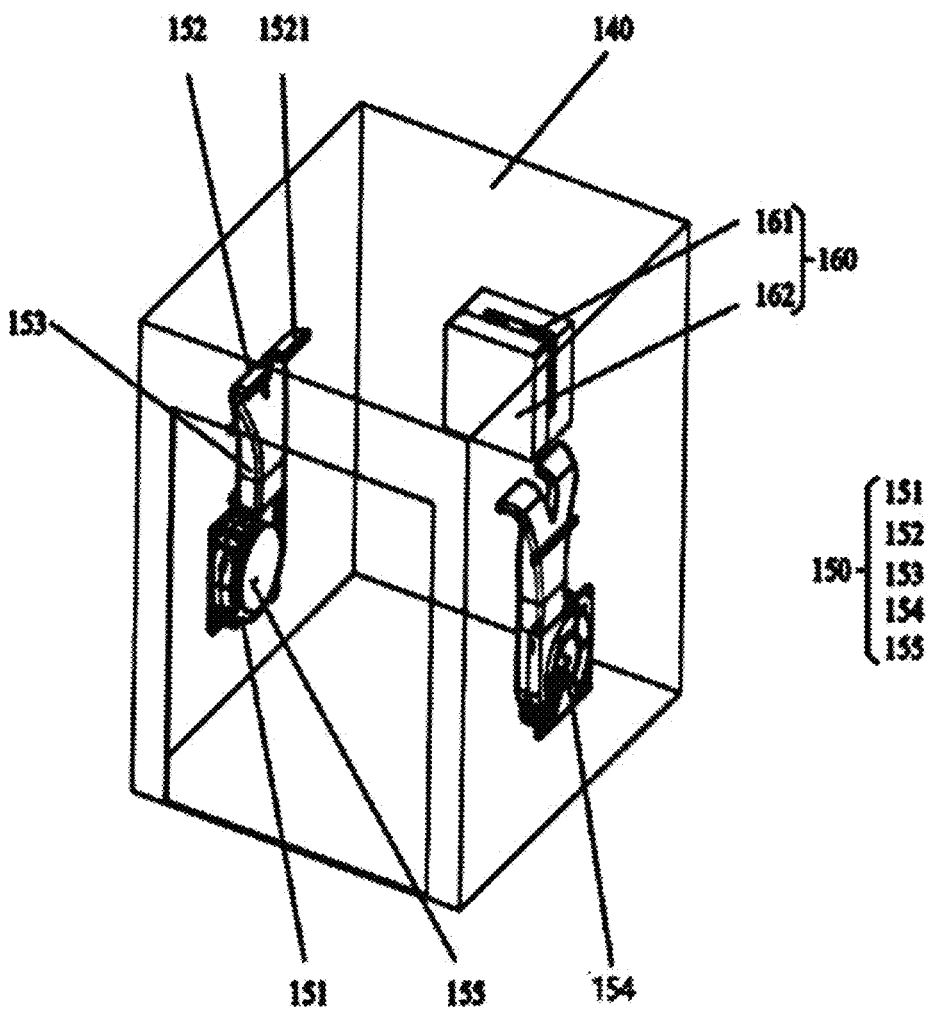
FIG. 6 illustrates a schematic structural diagram of a modeling apparatus provided in an embodiment of the present application.
Figure 7:
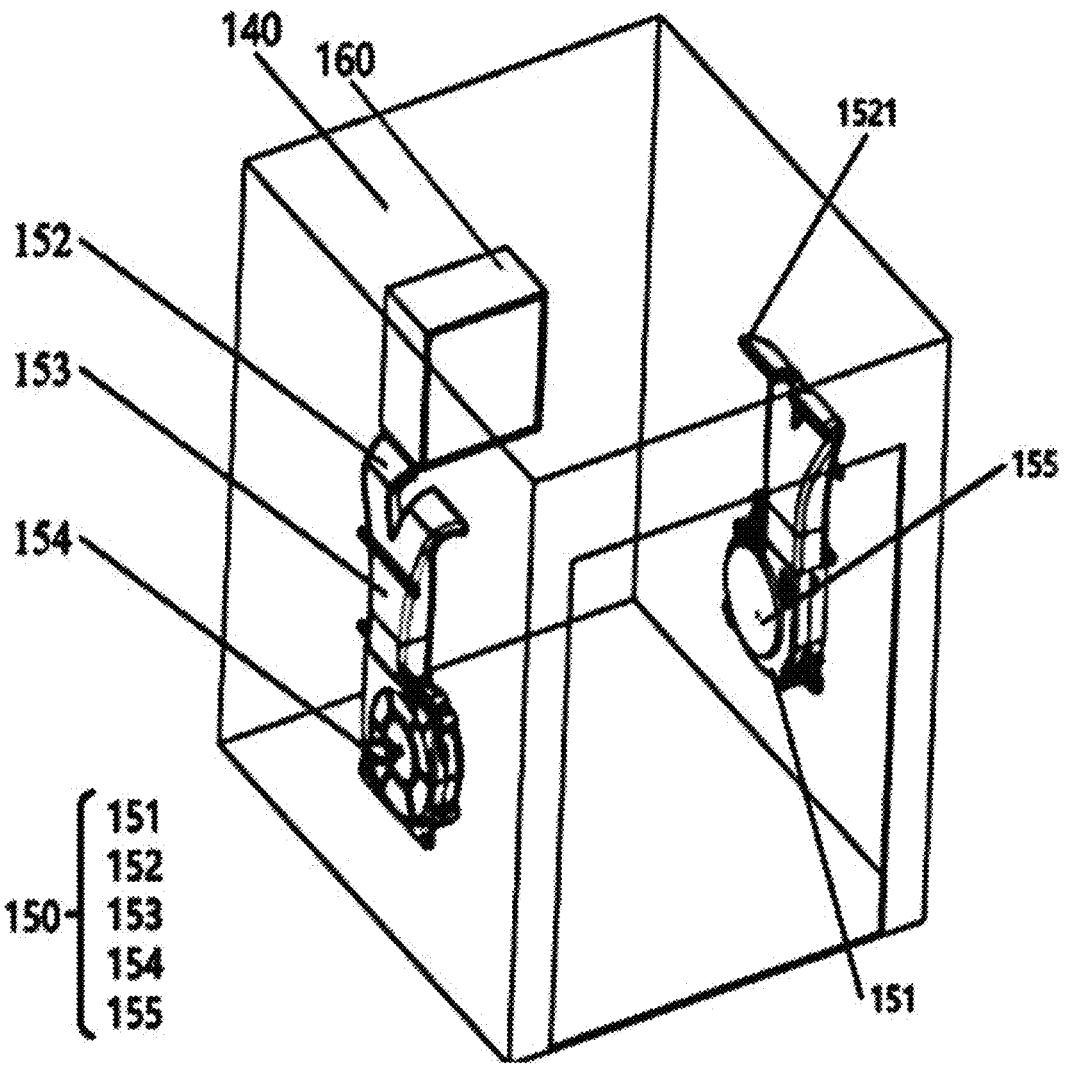
FIG. 7 illustrates a schematic structural diagram of a modeling apparatus provided in an embodiment of the present application.
Figure 8:
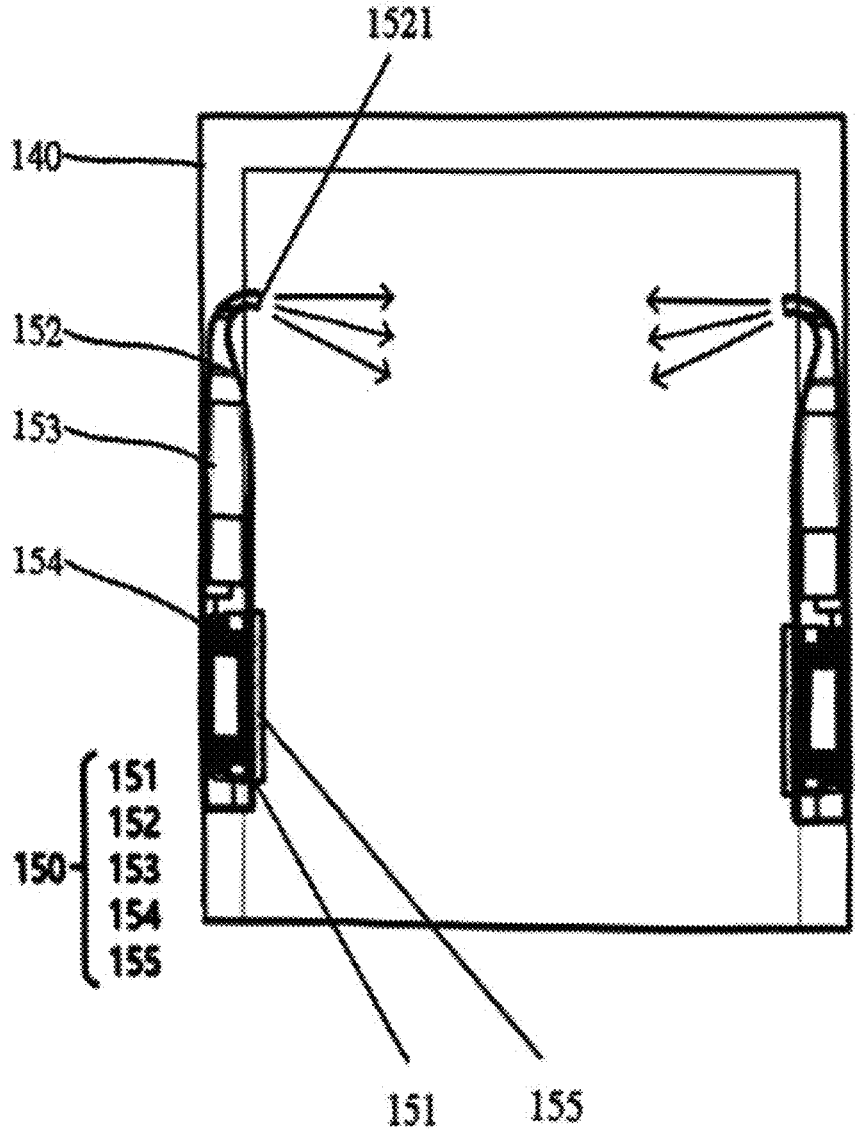
FIG. 8 illustrates a schematic structural diagram of a modeling apparatus provided in an embodiment of the present application.

The embodiments of the present application provide an internal circulation filter assembly 150 applicable to a modeling apparatus 100. FIGS. 6, 7, and 8 illustrate the structure of the internal circulation filter assembly 150. For illustrative purposes, part of the structure of the modeling apparatus 100 is also depicted. The modeling apparatus 100 may be an equipment configured for any of various functions such as 3D printing, laser engraving, cutting, and writing, or it may also be a modeling apparatus 100 that integrates the foregoing multiple functions.

As shown in FIGS. 6, 7, and 8, the modeling apparatus 100 comprises a casing 140 enclosing an accommodation cavity. The internal circulation filter assembly 150 comprises a first air inlet 151, a first air outlet 152, and a first air-guiding channel 153 communicating the first air inlet 151 with the first air outlet 152. Both the first air inlet 151 and the first air outlet 152 are in communication with the accommodation cavity, and the first air-guiding channel 153 is disposed between the first air inlet 151 and the first air outlet 152.

The internal circulation filter assembly 150 further comprises a first fan 154 and a first filter assembly 155. The first fan 154 is disposed between the first air inlet 151 and the first air outlet 152, and is configured to draw the exhaust gases in the accommodation cavity through the first air inlet 151. The exhaust gases are filtered by the first filter assembly 155 and then discharged from the first air outlet 152 through the first air-guiding channel 153.

The first fan 154 may be positioned anywhere between the first air inlet 151 and the first air outlet 152. For example, in FIG. 6, the first fan 154 is disposed between the first air inlet 151 and the first air-guiding channel 153. Alternatively, as a possible implementation, the first fan 154 may be disposed between the first air-guiding channel 153 and the first air outlet 152.

In the direction of airflow, the first filter assembly 155 may be positioned anywhere upstream of the first air outlet 152. For example, in FIG. 6, the first filter assembly 155 is located outside the first air inlet 151. In this configuration, air is filtered by the first filter assembly 155 before entering the first air-guiding channel 153 through the first air inlet 151, and is then discharged through the first air outlet 152. Alternatively, as a possible implementation, the first filter assembly 155 may be disposed upstream of the first fan 154 and the first air-guiding channel 153, or between the first air-guiding channel 153 and the first air outlet 152.

By means of the aforementioned technical solution, the internal circulation filter assembly 150 can achieve an effect of repeatedly filtrating the exhaust gases within the accommodation cavity through internal circulation mechanism, thereby efficiently purifying the exhaust gases and increasing the purification efficiency.

During 3D printing operations, this configuration can reduce environmental pollution caused by toxic gases. During laser cutting or laser engraving operations, it can prevent the accumulation of combustible gases within the accommodation cavity, thereby mitigating fire risks.

In some embodiments, the first fan 154 is an axial flow fan. Axial flow fans, characterized by their simple structure, high flow rate, and low pressure, can enhance the purification efficiency of the accommodation cavity when applied to the modeling apparatus 100.

In some embodiments, the first air inlet 151 is positioned below the first air outlet 152 along the first direction. As the exhaust gases generated within the modeling apparatus 100 are typically denser than air, they tend to accumulate in a lower portion of the accommodation cavity. Positioning the first air inlet 151 at a lower location can improve the internal air circulation efficiency.

In some embodiments, the distal end of the first air outlet 152 is provided with at least one guide member 1521, which is configured to direct airflow discharged from the first air outlet 152 to flow horizontally or at a first angle downward from the horizontal direction which is smaller than 90 degrees.

By means of the aforementioned technical solution, the guide member 1521 directs the airflow horizontally or in a downward inclined direction, enabling the airflow to cool workpieces on the work platform 130 and thereby accelerating the curing process.

In some embodiments, the first filter assembly 155 comprises one or a combination of more than one of a primary-efficiency filter screen, a medium-efficiency filter screen, a high-efficiency filter screen, and an activated carbon filter screen.

By means of the aforementioned technical solution, the filter assembly is configured as a multi-stage filter screen or a combination thereof, thereby enabling graded filtration of particulate matter and harmful gases in various application scenarios.

Based on the internal circulation filter assembly 150 as described in the aforementioned embodiments, the present application further provides a modeling apparatus 100. The modeling apparatus 100 may be an equipment configured for any of various functions such as 3D printing, laser engraving, cutting, and writing, or it may also be a modeling apparatus 100 that integrates the foregoing multiple functions. Such modeling apparatus 100 may generate pollutants including particulate matter and/or harmful gases during operation. The structure of the modeling apparatus 100 can be referred to in FIGS. 6, 7, and 8.

The modeling apparatus 100 provided in this embodiment comprises a casing 140 enclosing an accommodation cavity. The modeling apparatus 100 further comprises at least one internal circulation filter assembly 150. The internal circulation filter assembly 150 comprises a first air inlet 151, a first air outlet 152, and a first air-guiding channel 153 connecting the first air inlet 151 and the first air outlet 152. Both the first air inlet 151 and the first air outlet 152 are in communication with the accommodation cavity. The internal circulation filter assembly 150 further comprises a first fan 154 and a first filter assembly 155. The first fan 154 is disposed between the first air inlet 151 and the first air outlet 152 and is configured to draw exhaust gases inside the accommodation cavity through the first air inlet 151. The exhaust gases are filtered by the first filter assembly 155 and then discharged from the first air outlet 152 through the first air-guiding channel 153.

According to the aforementioned technical solution, an internal circulation filter component 150 is provided in the modeling apparatus 100, and is utilized to draw the exhaust gases inside the accommodation cavity, filter the exhaust gases and then discharge them back into the accommodation cavity, thereby achieving repeated filtration of the exhaust gases. Internal circulation of the exhaust gases within the accommodation cavity can prevent the harmful gases from escaping and causing environmental pollution and personal injury risks.

In some embodiments, the first fan 154 is an axial flow fan. Axial flow fans, characterized by their simple structure and high airflow capacity, can enhance the purification efficiency of the internal circulation filter assembly 150.

In some embodiments, the distal end of the first air outlet 152 is provided with at least one guide member 1521. The guide member 1521 is configured to direct airflow discharged from the first air outlet 152 to flow horizontally or at a first angle downward from the horizontal direction.

By directing the airflow horizontally or in a downward inclined direction with the guide member 1521, the airflow can cool workpieces on the work platform 130, thereby accelerating the curing process.

In some embodiments, the first filter assembly 155 comprises one or a combination of more than one of a primary-efficiency filter screen, a medium-efficiency filter screen, a high-efficiency filter screen, and an activated carbon filter screen.

In some embodiments, the modeling apparatus 100 comprises one internal circulation filter assembly 150, which is disposed on a sidewall of the casing 140 along the width direction of the casing 140. Alternatively, as illustrated in FIGS. 6, 7, and 8, the modeling apparatus 100 comprises two internal circulation filter assemblies 150, which are symmetrically disposed on two opposite sidewalls of the casing 140 along the width direction of the casing 140.

According to the aforementioned technical solution, in the modeling apparatus 100, an appropriate number of internal circulation filter assemblies 150 may be selected based on the size of the casing 140 and different purification requirements, so as to enhance the space utilization of the equipment and optimize the airflow circulation path.

The embodiments of the present application further provide an external circulation filter assembly 160 applicable to a modeling apparatus 100. FIGS. 6, 7, and 8 illustrate the structure of the external circulation filter assembly 160. For illustrative purposes, part of the structure of the modeling apparatus 100 is also depicted. The modeling apparatus 100 may be an equipment configured for any of various functions such as 3D printing, laser engraving, cutting, and writing, or it may also be a modeling apparatus 100 that integrates the foregoing multiple functions. As shown in FIGS. 6, 7, and 8, the modeling apparatus 100 comprises a casing 140 enclosing an accommodation cavity.

The external circulation filter assembly 160 comprises a second fan 161 and a second filter assembly 162. A second air-guiding channel is formed on a sidewall of the casing 140, for communicating the interior and exterior of the accommodation cavity. The second fan 161 and the second filter assembly 162 are disposed in the second air-guiding channel. Under the action of the second fan 161, the exhaust gases inside the accommodation cavity are filtered by the second filter assembly 162 and discharged to the exterior of the accommodation cavity.

During operation, the external circulation filter assembly 160 draws air from the accommodation cavity, filters it, and discharges it to the outside of the accommodation cavity. By discharging air outward to create a negative pressure inside the casing 140, other gaps in the casing 140 can act as air intakes, thereby preventing leakage of the exhaust gases. Meanwhile, part of the exhaust gases can be purified through the second filter assembly 162.

In some embodiments, the first filter assembly 155 and the second filter assembly 162 may by any of a primary-efficiency filter screen, a medium-efficiency filter screen, a high-efficiency filter screen, or an activated carbon filter screen, or it may also be a combination of any number of the aforementioned filter screens.

In some embodiments, the second fan 161 is a centrifugal fan. Centrifugal fans, characterized by their high static pressure, can ensure that the exhaust gases are discharged over long distances, preventing odor backflow.

Based on the external circulation filter assembly provided in the aforementioned embodiments, the present application further provides a modeling apparatus 100. The modeling apparatus 100 may be an equipment configured for any of various functions such as 3D printing, laser engraving, cutting, and writing, or it may also be a modeling apparatus 100 that integrates the foregoing multiple functions. Such modeling apparatus 100 may generate pollutants including particulate matter and/or harmful gases during operation. The structure of the modeling apparatus 100 can be referred to in FIGS. 6, 7, and 8.

The modeling apparatus 100 provided in this embodiment comprises a casing 140 enclosing an accommodation cavity. The modeling apparatus 100 further comprises an external circulation filter assembly 160. The external circulation filter assembly 160 comprises a second fan 161 and a second filter assembly 162. A second air-guiding channel is formed on a sidewall of the casing 140, for communicating the interior and exterior of the accommodation cavity. The second fan 161 and the second filter assembly 162 are disposed in the second air-guiding channel. The second fan 161 is configured to discharge the exhaust gases inside the accommodation cavity through the second air-guiding channel to the exterior of the accommodation cavity.

According to the aforementioned technical solutions, an external circulation filter assembly is provided in the modeling apparatus 100, and is utilized to filter the exhaust gases in the accommodation cavity and discharge them to the outside, thus preventing accumulation of harmful gases within the accommodation cavity. Additionally, as the air in the cavity is drawn out under the action of the external circulation filter assembly, a negative pressure environment is generated within the accommodation cavity, thereby preventing harmful gases from escaping through gaps in the casing 140.

In some embodiments, the second filter assembly 162 comprises one or a combination of more than one of a primary-efficiency filter screen, a medium-efficiency filter screen, a high-efficiency filter screen, and an activated carbon filter screen.

In some embodiments, the second fan 161 is a centrifugal fan. Based on the characteristics of high airflow and high static pressure of the centrifugal fans, rapid ventilation within the accommodation cavity is achieved.

The embodiments of the present application further provide a modeling apparatus 100 comprising a print head assembly 110 as described in any of the preceding embodiments, and at least one internal circulation filter assembly 150 and/or external circulation filter assembly 160 as described in any of the preceding embodiments.

It should be understood that the modeling apparatus 100 may incorporate both an internal circulation filter assembly 150 and an external circulation filter assembly 160, or only one of them.

In some embodiments, the modeling apparatus 100 comprises a casing 140. The modeling apparatus 100 may comprise one internal circulation filter assembly 150 disposed on a sidewall of the casing 140 along a width direction of the modeling apparatus 100. Alternatively, the modeling apparatus 100 may comprise two internal circulation filter assemblies 150 disposed on two opposite sidewalls of the casing 140 along the width direction of the modeling apparatus 100.

In the description of the present application, terms indicating orientations such as center," "longitudinal," "lateral," "length," "width," "thickness," "upper," "lower," "front," "rear," "left," "right," "vertical," "horizontal," "top," "bottom," "interior," "exterior," "clockwise," "counterclockwise," "axial," "radial," "circumferential," and the like are based on the orientations depicted in the drawings and are for illustrative purposes only. These terms are not intended to limit the scope of the present application.

In the present application, terms such as "mounted," "connected," and "fixed" should be broadly construed unless explicitly defined otherwise. For example, "connected" may denote a fixed connection, a removable connection, or an integral connection; it may denote a mechanical connection or an electrical connection; it may denote a direct connection or an indirect connection through intermediaries; it may denote an internal connection or an interactional relationship between components. Those skilled in the art should interpret the specific meanings of these terms in the context of the present application.

In the present application, terms such as "on," "above," "below," and "under" may denote direct contact or indirect contact through intermediaries. For example, "above" may denote that a first component is directly above a second component or that the first component is indirectly above the second component with one or more additional components in between.

The descriptions in the specification of the present application, such as "an embodiment," "some embodiments," "an example," "a specific example," or "some examples," are intended to combine the features, structures, materials, or characteristics described in the embodiment or example with at least one embodiment or example of the present application. The illustrative representations of these terms are not necessarily directed to the same embodiment or example. Furthermore, the described features, structures, materials, or characteristics may be combined in any suitable manner in one or more embodiments or examples.

The foregoing descriptions are merely preferred embodiments of the present application and are not intended to limit the scope of the present application. Any modifications, equivalent substitutions, and improvements made within the spirit and principles of the present application shall fall within the protection scope of the present application.

The invention claimed is:

1. A filter assembly applicable to a modeling apparatus that comprises a casing enclosing an accommodation cavity; wherein, the filter assembly comprises an internal circulation filter assembly configured to prevent exhaust gases from escaping to the outside of the accommodation cavity by repeatedly filtering the exhaust gases, during 3D printing, wherein the internal circulation filter assembly comprises a first air inlet, a first air outlet and a first air-guiding channel connecting the first air inlet and the first air outlet, and both the first air inlet and the first air outlet communicate with the accommodation cavity; the internal circulation filter assembly further comprises a first fan and a first filter assembly, wherein the first fan is configured to draw the exhaust gases inside the accommodation cavity through the first air inlet, and the exhaust gases are filtered by the first filter assembly and then discharged back into the accommodation cavity from the first air outlet through the first air-guiding channel; wherein a distal end of the first air outlet is provided with at least one guide member, which is configured to direct airflow discharged from the first air outlet to flow horizontally or at a first angle downward from a horizontal direction which is smaller than 90 degrees, thereby enabling airflow to cool workpieces;

and, the filter assembly comprises an external circulation filter assembly configured to at least mitigate fire risks caused by an accumulation of combustible gases within the accommodation cavity during laser engraving or cutting and further configured to create a negative pressure environment inside the accommodation cavity to prevent harmful gases from escaping through gaps in the casing, wherein the external circulation filter assembly comprises a second fan and a second filter assembly, a second air-guiding channel is formed on a sidewall of the casing for communicating the interior and exterior of the accommodation cavity, and the second fan and the second filter assembly are provided in the second air-guiding channel; the second fan is configured to discharge gases inside the accommodation cavity to the outside of the accommodation cavity through the second air-guiding channel.

2. The filter assembly according to claim 1, wherein the first fan is an axial flow fan.

3. The filter assembly according to claim 1, wherein the first fan is provided between the first air inlet and the first air outlet.

4. The filter assembly according to claim 1, wherein the first fan is provided between the first air inlet and the first air-guiding channel, or, the first fan is provided between the first air-guiding channel and the first air outlet.

5. The filter assembly according to claim 1, wherein the first filter assembly comprises one or a combination of more than one of a primary-efficiency filter screen, a medium-efficiency filter screen, a high-efficiency filter screen, and an activated carbon filter screen.

6. The filter assembly according to claim 1, wherein the first filter assembly is provided on an outer side of the first air inlet, or the first filter assembly is provided upstream of the first fan and the first air-guiding channel, or the first filter assembly is provided between the first air-guiding channel and the first air outlet.

7. The filter assembly according to claim 1, wherein the external circulation filter assembly is operable to draw air inside the accommodation cavity, filter the air, and then discharge it to the outside of the accommodation cavity; the casing is provided with an air intake, and the external circulation filter assembly creates a negative pressure inside the casing by exhausting the air outward.

8. The filter assembly according to claim 1, wherein the second filter assembly comprises one or a combination of more than one of a primary-efficiency filter screen, a medium-efficiency filter screen, a high-efficiency filter screen, and an activated carbon filter screen.

9. A modeling apparatus comprising a casing that encloses an accommodation cavity, wherein the modeling apparatus further comprises the filter assembly according to claim 1.

10. The modeling apparatus according to claim 9, wherein the internal circulation filter assembly is provided in a quantity of one, with the one internal circulation filter assembly being provided on a sidewall of the casing, or, the internal circulation filter assembly is provided in a quantity of two, with the two internal circulation filter assemblies being symmetrically provided on opposite sidewalls of the casing.

11. The modeling apparatus according to claim 9, wherein the modeling apparatus integrates at least one of the functions of 3D printing, laser engraving, cutting, and writing.

12. The modeling apparatus according to claim 11, wherein the modeling apparatus is configured to utilize the internal circulation filter assembly to repeatedly filter the exhaust gases inside the accommodation cavity, when the modeling apparatus is performing 3D printing.

13. The modeling apparatus according to claim 11, wherein the modeling apparatus further comprises a print head assembly, a drive unit, and a work platform; wherein, the print head assembly is connected to the drive unit and is driven by the drive unit to generate displacement relative to the work platform;

the print head assembly comprises a mounting portion and an expansion module, the mounting portion comprising at least one first guide member extending along a first direction, the expansion module comprising at least one second guide member extending along the first direction, the first guide member and the second guide member being mutually engageable;

the print head assembly further comprises a locking mechanism configured to provide a force for the mounting portion and the expansion module to move closer to or away from each other when the first guide member and the second guide member are mutually engaged, so as to restrict movement of the expansion module in a second direction perpendicular to the first direction.

14. The modeling apparatus according to claim 13, wherein the expansion module is a laser module, and the drive unit is configured to drive the laser module to move on a horizontal plane to cut and/or engrave a material.

15. The modeling apparatus according to claim 14, wherein a rotating device is provided on the work platform, and the rotating device is configured to drive a rotating body or an object with an irregular surface to rotate.

16. The modeling apparatus according to claim 14, wherein the laser module is configured to emit a laser beam to irradiate the material, causing the material to melt, vaporize, or reach its ignition point, and the molten or burning material can be blown away by an airflow coaxial with the laser beam.

17. The modeling apparatus according to claim 14, wherein the modeling apparatus is configured to utilize the external circulation filter assembly to filter exhaust gases in the accommodation cavity and then discharge them to the outside of the accommodation cavity, when the modeling apparatus is performing engraving or cutting operations.

18. The modeling apparatus according to claim 13, wherein the locking mechanism comprises at least one eccentric wheel handle assembly, the eccentric wheel handle assembly comprising an eccentric wheel rotatably connected to the expansion module and a handle fixedly connected to the eccentric wheel.

19. The modeling apparatus according to claim 13, wherein the mounting portion further comprises a positioning unit, the positioning unit comprising a first stopper and/or at least one snap-fit structure; wherein, the first stopper comprises a blocking plate provided at an end of the mounting portion along the first direction;

the snap-fit structure comprises a first snap formed on the mounting portion and a second snap formed on the expansion module; when the expansion module slides along the first direction to the end of the mounting portion under constraint of the first guide member and the second guide member, the first snap and the second snap are mutually engaged.

20. The modeling apparatus according to claim 19, wherein when the expansion module slides along the first direction to a position where the first snap and the second snap are mutually engaged under the constraint of the first guide member and the second guide member, the locking mechanism is configured to lock the expansion module and the mounting portion together.

* * * * *